(12) United States Patent
Benyoub et al.

(10) Patent No.: US 8,295,540 B2
(45) Date of Patent: Oct. 23, 2012

(54) METHOD AND A MACHINE FOR PROCESSING MAIL RUNS USING MATRIX ACCUMULATORS

(75) Inventors: Belkacem Benyoub, Palaiseau (FR); Emmanuel Piegay, Paris (FR); Mathieu Letombe, Paris (FR)

(73) Assignee: SOLYSTIC, Gentilly Cedex (FR)

( * ) Notice: Subject to any disclaimer, the term of this patent is extended or adjusted under 35 U.S.C. 154(b) by 0 days.

(21) Appl. No.: 13/289,837

(22) Filed: Nov. 4, 2011

(65) Prior Publication Data

US 2012/0116573 A1     May 10, 2012

(30) Foreign Application Priority Data

Nov. 5, 2010   (FR) ...................................... 10 59115

(51) Int. Cl.
*G06K 9/00*          (2006.01)

(52) U.S. Cl. ........ 382/101; 382/100; 382/102; 382/177; 382/179; 382/189

(58) Field of Classification Search ................. 382/101, 382/102, 177, 179, 189; 209/584, 900; 705/401, 705/406
See application file for complete search history.

(56) References Cited

U.S. PATENT DOCUMENTS

| | | | |
|---|---|---|---|
| 6,901,151 B1 | 5/2005 | Rosenbaum et al. | |
| 8,126,822 B1 * | 2/2012 | Sansone et al. | 705/401 |
| 2003/0152269 A1 * | 8/2003 | Bourbakis et al. | 382/187 |
| 2004/0128254 A1 * | 7/2004 | Pintsov | 705/62 |
| 2005/0123170 A1 * | 6/2005 | Desprez et al. | 382/101 |

FOREIGN PATENT DOCUMENTS

| | | |
|---|---|---|
| EP | 1622065 A1 | 2/2006 |
| EP | 1791080 A1 | 5/2007 |
| WO | WO 01/86581 A1 | 11/2001 |

OTHER PUBLICATIONS

French International Search Report, Appln. No. FR 1059115, dated Jul. 12, 2011 (2 pages).

* cited by examiner

*Primary Examiner* — Ali Bayat
(74) *Attorney, Agent, or Firm* — Rothwell, Figg, Ernst & Manbeck, P.C.

(57) ABSTRACT

A method of processing uniform mailpieces referred to as a "run" of mailpieces, during which method OCR is performed for recognizing certain information in a zone of interest of an image of each mailpiece, and during which method the following steps are performed:
    a) initializing a matrix accumulator associated with said run and including unitary accumulation elements that correspond to the pixels of the image;
    b) consolidating said matrix accumulator by incrementing certain unitary accumulation elements by deriving an indication of the spatial position of a block of pixels in which said certain information has been recognized unambiguously, or by using construction and local graphical correlation of blocks of image pixels to derive an optical flow map indicating local graphical movements; and
    c) defining, in the OCR processing, said zone of interest on the basis of the unitary accumulation elements of the consolidated matrix accumulator that present extreme accumulation values.

10 Claims, 4 Drawing Sheets

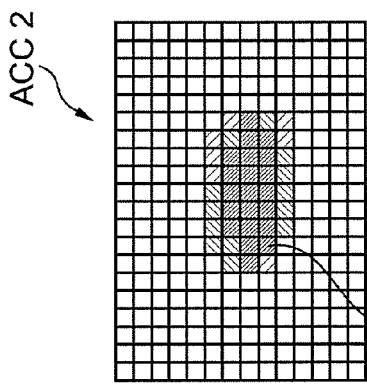
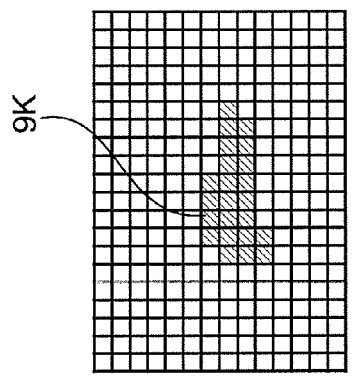
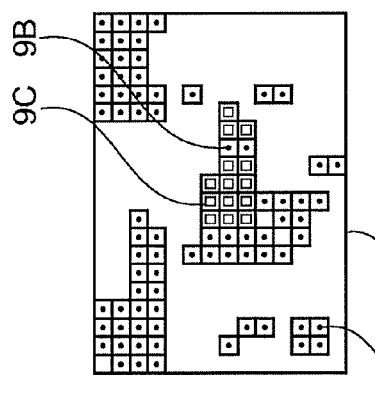
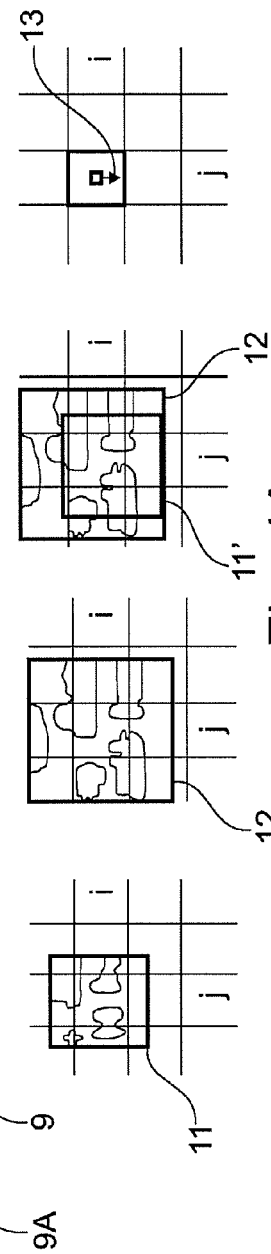
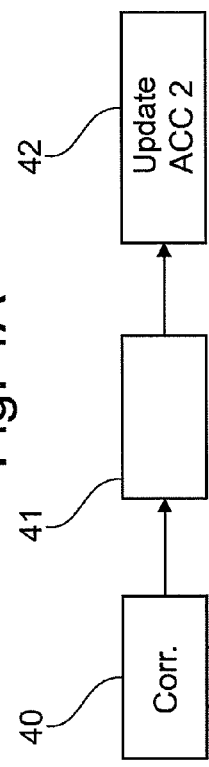
Fig. 3
Fig. 4A
Fig. 4B

METHOD AND A MACHINE FOR PROCESSING MAIL RUNS USING MATRIX ACCUMULATORS

TECHNICAL FIELD

The invention relates to the field of processing mail, namely letters, magazines, parcels, and other mailpieces suitable for being machine processed automatically, in particular in a postal sorting machine.

The invention relates more particularly to a method of processing mail, in which method it is assumed that mailpieces belong to a group of uniform mailpieces referred to as a "run", and, for each mailpiece in the run, optical character recognition (OCR) is performed on certain information to be recognized in a predetermined zone of interest of an image of the mailpiece, the zone of interest being associated in a memory with the run in order to force OCR thereon.

The invention also relates to a machine for processing mail, in particular for sorting the mail into sorting outlets of a sorting conveyor, the machine including an image acquisition system connected to a data-processing and monitoring-and-control unit.

PRIOR ART

For processing a run of uniform mailpieces, use has already been made of software tools for graphical pointing on a display screen, for the purposes of defining the recipient address block in the image and of forcing the OCR processing to work on an image zone that corresponds to the zone in which the recipient address block is present. Such tools are known as "area limiters" or "zone limiters". The principle of an area limiter is to clip a reference image of a mailpiece in a predetermined run so that only a "frame" around the recipient address block remains. In practice, an OCR address recognition process starts with a stage for locating information blocks in the image (blocks of pixels containing the information), and then the detected blocks are sequenced by giving priority to the information block that appears to correspond to the recipient address information block. The sequencing can use pre-recorded data indicating probable positions for the various information blocks (sender address block—recipient address block—stamps—, etc.) on the mail. These probable positions can vary from one country to another depending on the practices and constraints of the various postal authorities.

The area limiter thus makes it possible to force this location stage to search for the information block within the clipped area or "frame" designated by the area limiter, thereby limiting recognition errors. Such a tool suffers from the drawback of requiring manual action from an operator whenever a run appears in a stream of mail, thereby making that tool unsuitable for short runs, e.g. runs of a few hundred mailpieces, because of the time required for operating the area limiter. Detecting whether or not a mailpiece belongs to a run does not lie within the ambit of the present invention. Various methods exist for automatically detecting runs on the basis of data or of models that are characteristic of runs. In particular, European Patent Document EP 1 622 065 describes a method of automatically detecting runs for the purposes of automatically parameterizing the OCR reader, and of automatically detecting the read rate for each run with a view to applying a discount to the postage price that is proportional to said read rate. That method includes a step of capturing a digital image of each mailpiece, a step of using OCR for automatic address recognition, and a step of extracting image attributes for identifying whether the mailpiece belongs to a run that has its model pre-recorded in a catalog of models. That catalog is dynamic and the models that it contains are updated by being enriched with the information relating to the mailpieces that have been processed.

Patent Document EP 0 938 066 also discloses a method of processing mail that belongs to a run. In that method two images of respective ones of two consecutive mailpieces in a stream of mailpieces are correlated graphically so as to detect whether said two images are uniform, and thus whether the two mailpieces belong to the same run.

Patent Document EP 1 791 080 also discloses a method of sorting mailpieces, during which method a search is made for a marking in a first zone of the current mailpiece, and then, in the event that detection fails in said first zone, a search is made for the marking in a second zone. The zone(s) in which the marking is detected is/are stored in a memory, and information about the document is deduced from said marking, e.g. about the type of document to be processed. The search zones may be determined at the end of detection performed on the mailpiece in full, or they may be predetermined and stored in a memory so as to be used during detection targeted on those stored zones. Detection in those zones may be implemented by using a matrix of co-ordinates.

Patent Document WO 01/86 581 also discloses a method of sorting mailpieces, during which method the recipient address of the current mailpiece is detected and read automatically. That recipient address is provided on a label bearing, in particular, a bar code indicating the sender. One or more standard positions for the address block are recorded in a database and correspond(s) to each sender. By reading the bar codes it is thus possible to identify the sender rapidly, and to focus the address search on the standard positions. The database may be compiled as processing progresses, depending on the probability of position repeating.

Finally, Patent Document U.S. Pat. No. 6,901,151 discloses a method of sorting mailpieces to be returned to sender, during which method sorting is facilitated by analyzing the visual similarity between the current mailpiece and mailpieces that have already been processed.

In general, automatic location of the recipient address block in an OCR address recognition unit is based on three criteria: the morphology of the block, the position of the block in the image as compared with standard positions that are country-specific, and its lexical content.

The location process might identify a block of pixels as being a recipient address block even though it is actually an advertising message on the mailpiece, for example. There is then no unambiguously recognized address, and the machine-processing of the mailpiece results in the mailpiece being rejected into a predetermined sorting outlet.

The process of locating the address block can also mistake the sender address block for the recipient address block, the sender address block appearing, in particular, on bulk mail. A postal address can then be recognized automatically by OCR but the machine processing of the mailpiece then results in an error situation, i.e. the mailpiece is improperly sorted among the other mailpieces, thereby giving rise to a delivery error for said mailpiece and thus to additional processing costs for the postal center.

SUMMARY OF THE INVENTION

An object of the invention is to provide a method of processing mailpieces that belong to runs as indicated above, in which automatic assistance with locating the recipient address block (or with locating some other image zone of interest in which certain information is to be recognized automatically) is provided so that, in particular, the recipient address recognition error rate is reduced.

To this end, the invention provides a method of processing mail, in which method it is assumed that mailpieces belong to a succession of uniform mailpieces or "run", and, for each mailpiece in the run, OCR is performed on certain information to be recognized in a zone of interest of an image of said mailpiece, said zone of interest being associated in a memory with said run so as to force said OCR thereon, wherein the method comprises the steps of:

a) initializing a matrix accumulator associated with said run of mailpieces and including unitary accumulation elements that correspond to the pixels of the image of a mailpiece of the run;

b) on the basis of the image of the mailpiece, identifying pixels of interest that are representative of said zone of interest, and consolidating said matrix accumulator by incrementing the unitary accumulation elements of the matrix accumulator that coincide with said pixels of interest; and c) defining, in the OCR processing, said zone of interest of the image on the basis of the unitary accumulation elements of the consolidated matrix accumulator that present extreme accumulation values;

and wherein, during the identification step, at least one of the following steps is performed:

for consolidating said matrix accumulator, the OCR processing for a mailpiece of the run is used to derive an indication of the spatial position of a block of pixels in which the OCR processing has recognized said certain information unambiguously, the pixels of said block of pixels constituting pixels of interest; and for consolidating said matrix accumulator, deriving an optical flow map by construction and local graphical correlation of blocks of image pixels, said flow map being indicative of local graphical movements of pixels between two images of different mailpieces of the run, the image pixels corresponding to such graphical movements constituting pixels of interest, said optical flow map enabling the movements of said unitary accumulation elements to be tracked dynamically, and thus reinforcing the robustness of detection of said zone of interest.

The method of the invention may have the following features.

Advantageously, the optical flow map is computed using a method of local graphical correlation between blocks of pixels of the two images of mailpieces of the run.

Said certain information to be recognized by OCR may be recipient address information, or sender address information, or franking information, or indeed a pictorial indication, such as a logo or an advertising slogan on which data-processing might be triggered during postal sorting, for example.

The invention stems from the observation that, in a run of mailpieces coming from the same sender, the frame defining the recipient address block, for example, has a spatial position in the images of the various mailpieces of the run that is relatively stable, e.g. in the bottom right-hand corner of the image.

If it is assumed that each time the OCR processing results in an unambiguous recognition of a recipient address, it is possible to retrieve from the OCR processing the exact co-ordinates of the frame within which an address has been recognized unambiguously by OCR, e.g. the co-ordinates of the diametrically opposite corners of the frame encompassing all of the characteristics of the recipient address recognized by OCR, then, as the OCR processing operations progress on a series of mailpieces belonging to the same run, a series of frames are obtained that should normally overlap or be superposed to within a certain amount of tolerance.

The basic idea of the invention is to track dynamically the variation in the mutual overlap zone of said frames in an accumulator that statistically tends to become increasingly stable as the processing of the mailpieces of the run progresses, and to use said mutual overlap zone that becomes increasingly stable to define, dynamically, the image zone of interest within which OCR is applied to the mailpieces of the run. This stable overlap zone is identified in the accumulator by a score or by an extreme accumulation value that actually corresponds to maximum repetition of the mutual overlap.

More particularly, in accordance with the invention, successive use is made of a first matrix accumulator of a first type as consolidated on the basis of indications derived from the OCR processing by incrementing the unitary accumulation elements of the matrix accumulator, and of a second matrix accumulator of a second type as consolidated on the basis of indications derived from optical flow maps by incrementing the unitary accumulation elements of the matrix accumulator, these two accumulators varying independently so as to locate with greater robustness the block of pixels of the recipient address in the images of mailpieces belonging to the same run.

One of or both of the two accumulators can also be used to validate the sequencing of various blocks of information detected during an OCR address recognition process.

In accordance with a feature of the method of the invention, the second matrix accumulator is used firstly for defining said zone of interest in the images of first mailpieces of the run, and then the first matrix accumulator is used for defining said zone of interest in the images of second mailpieces subsequent to the first mailpieces in the succession of mailpieces of the run, because it has been observed that the first accumulator becomes statistically stable after the second accumulator.

In advantageous manner, said first accumulator is used as an area limiter for defining a zone of interest and the second accumulator is used to consolidate a matrix of scores produced by a training stage.

The invention also provides a machine for processing mail, in particular for sorting mail into sorting outlets of a sorting conveyor, said machine including an image acquisition system connected to a data-processing and monitoring-and-control unit, in which machine said unit is arranged to implement the method as described above.

BRIEF DESCRIPTION OF THE DRAWINGS

An implementation of the method of the invention is described below in more detail with reference to the drawings, in which:

FIG. 3 shows the principle for forming the second type of accumulator;

FIG. 4A shows the principle for the local graphical correlation implemented to consolidate the second type of accumulator;

FIG. 4B shows the principle for consolidating the second type of accumulator;

DESCRIPTION OF IMPLEMENTATIONS

Figure 1:
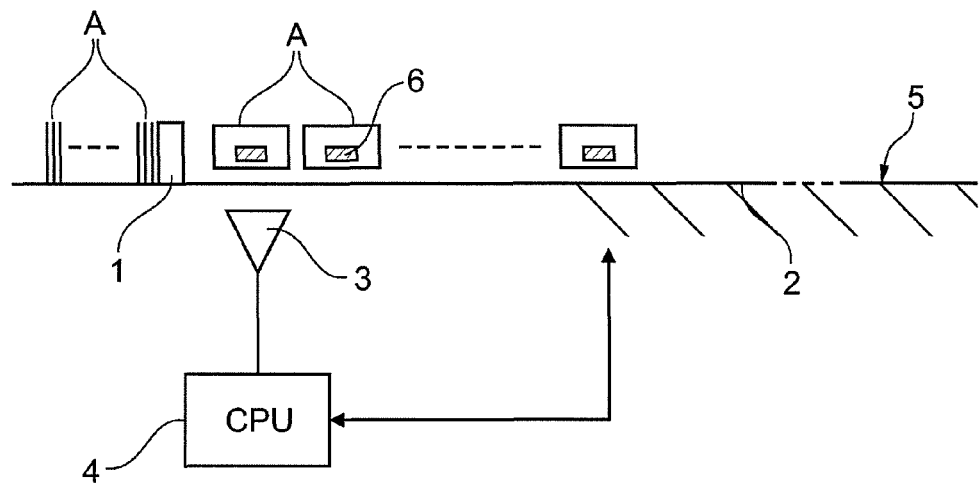
FIG. 1 is a highly diagrammatic view of a postal sorting machine.

FIG. 1 is a highly diagrammatic view of a postal sorting machine including an unstacker 1 that takes mailpieces A that are placed in a stack in a feed magazine and puts them in series on edge. The mailpieces A are moved on edge in a sorting conveyor 2, e.g. a belt conveyor, and they go past a digital image acquisition system 3 connected to a data-processing and monitoring-and-control unit 4. The data-processing and monitoring-and-control unit 4 acts on the sorting conveyor 2 so as to direct the mailpieces towards sorting outlets such as 5.

The mail-sorting process of the invention is implemented essentially in the data-processing and monitoring-and-control unit 4 in the form of a computer program.

The digital image acquisition system 3 is used for OCR recognition of address information on the surfaces of the mailpieces. As is well known, this system is provided downstream from the unstacker 1, with a view, in particular, to recognizing a recipient address represented diagrammatically by a small rectangle 6 on one face of a mailpiece. When the address on a mailpiece is recognized unambiguously by the OCR address recognition unit 4, said unit controls the sorting conveyor 2 in such a manner as to direct the mailpiece towards a corresponding sorting outlet 5 as is well known.

In this mail-processing process, provision is thus made for a digital image of a current mailpiece that is placed in a stream of mailpieces A as shown in FIG. 1 to be acquired by means of the digital image acquisition system 3, e.g. a grayscale digital camera, and provision is made for the data-processing and monitoring-and-control unit 4 of the machine to be suitable for detecting, on the basis of this digital image, whether said mailpiece belongs to a run, i.e. to a group of uniform mailpieces coming from the same sender.

A run may be constituted by a series of consecutive uniform mailpieces coming from the same sender, which series may be of shorter or longer length. In general, a run has more than one hundred uniform mailpieces. In the simplest situation, the mailpieces differ graphically only by variation in the mailpiece recipient address information.

Overall, the data characterizing a run that makes it possible to recognize that a certain mailpiece belongs to the run is gathered in a memory in the data-processing and monitoring-and-control means 4 in a sort of digital dictionary or directory. Setting data is also associated in the memory with each run so that, correspondingly, the OCR process is forced on a zone of interest of the image.

Such characteristic data or such a model of the run may describe a plurality of attributes for the mailpieces in the run, such as type of mail (paper or plastic-wrapped), or indeed graphical characteristics of the mail (observed position of the recipient address block—observed position of the sender address block—standard position of a bar code, etc.), it also being possible for these indications to improve the reliability of the processing of the mailpieces.

The processing method of the invention aims mainly to reinforce the robustness of recipient address block detection by giving automatic assistance with locating the recipient address block during the OCR address recognition processing in difficult situations, e.g. when the surfaces of the mailpieces of a run are cluttered with information other than the recipient address information, or indeed when said recipient address is in a non-standard position.

The method of the invention is thus based on the use of at least one matrix accumulator that dynamically defines the zone of interest in the images of the mailpieces of a run, with OCR address recognition processing being forced on that zone. The matrix accumulator of the invention is a matrix in which each unitary element corresponds to a mailpiece image pixel or to a group of pixels of a mailpiece digital image, depending on the level of resolution chosen for the accumulator. Each unitary element of the accumulator is a counter that is incremented, during a consolidation phase, as processing of successive mailpieces progresses, so that the unitary elements having extreme values tend to define the predetermined image zone to which the OCR is applied.

As explained below, it is possible to use two matrix accumulators that are independent from each other to define dynamically a predetermined image zone corresponding to the recipient address block: a first matrix accumulator that is consolidated with indications derived directly from the OCR address recognition process; and a second matrix accumulator that is consolidated with indications derived from a graphical correlation between images of the mailpieces.

In general, the first matrix accumulator may make it possible to locate automatically any type of information that is recognizable in the image of a mailpiece, such as the sender address, a franking mark, or indeed a logo or a pictorial indication such as an advertising slogan.

Figure 2A:
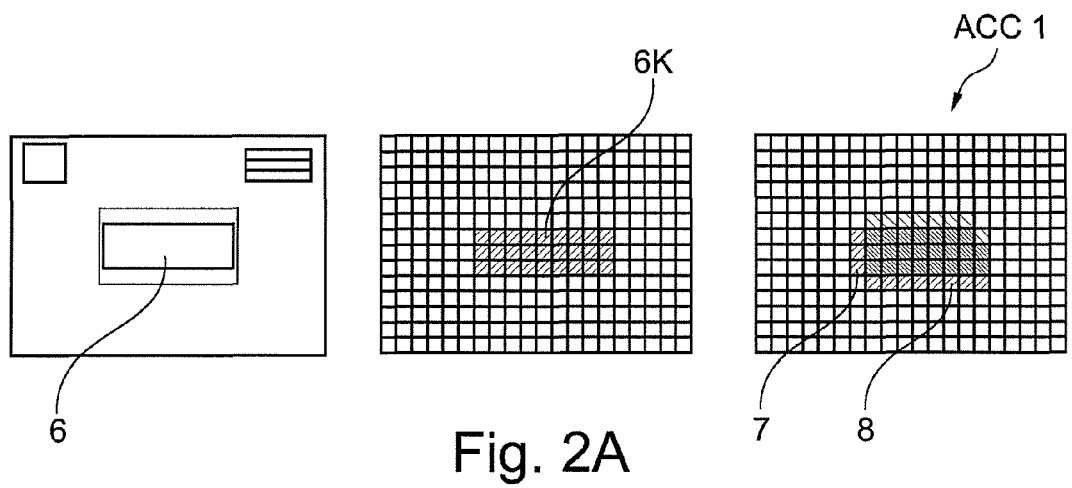
FIG. 2A shows the principle for forming the first type of accumulator.

FIG. 2A shows the first matrix accumulator designated by ACC1 next to a digital image of a mailpiece, in which image the recipient address block 6 appears. The matrix accumulator ACC1 is graphically superposable on the digital image containing the recipient address block 6. In this figure, the pixels 6K designate the pixels of interest. In the accumulator ACC1, squares show the unitary accumulation elements that, in this example, are made up of dark unitary elements 7 and of lighter unitary elements 8. If the unitary elements 7 are those that have the extreme accumulation values after consolidation, said unitary elements 7 substantially define the image zone corresponding to the frame around the recipient address block 6.

As the processing of the successive mailpieces in the run progresses, the principle of consolidating the matrix accumulator ACC1 is to identify pixels of interest and to increment (e.g. by one unit) the accumulation values of the unitary elements 7 of the matrix accumulator ACC1 that coincide spatially with said pixels of interest, i.e. that are superposed thereon.

More particularly, in order to identify said pixels of interest, the spatial position co-ordinates of the block of pixels on which the OCR processing has given an unambiguous result are derived from the OCR processing on the image of a current mailpiece of the run, such an unambiguous result being, in the example, when the automatic OCR processing has resulted in a delivery postal address of a recipient.

However, it is known that OCR processing can drift and give an erroneous result, e.g. if the sender address block is mistaken for the recipient address block. To remove any doubt about whether or not a mistake is being made, before the accumulator ACC1 is consolidated with said pixels of interest, it is possible to compare the textual and postal content of the recipient address block 6 that is decoded unambiguously by OCR for the current mailpiece with the textual and postal context decoded by OCR and recorded for the mailpiece preceding said current mailpiece, insofar as these two mailpieces belong to the same run. For example, if the content of the recipient address block 6 differs from one mailpiece to another in the run, it can be considered that there is no possibility that a sender address block is being mistaken for a recipient address block 6, whereas, conversely, if the content does not differ, or differs only to a very small extent, it can be considered that the OCR processing is in a mistaken address block situation.

Therefore, before consolidating the matrix accumulator ACC1 with pixels of interest derived from OCR processing for a current mailpiece of the run, the content of the address block returned by OCR is checked against the content of the address block returned by OCR for the preceding mailpiece so as to detect presence or absence of a mistaken address block situation, and, on detecting absence of a mistake, the unitary elements 7 of the matrix accumulator ACC1 that coincide with the pixels of interest are incremented as indicated above.

In FIG. 2A, the unitary elements 7 have larger accumulation values (it is considered that they are the instantaneous extreme accumulation values) than the unitary elements 7 so as to illustrate the fact that the spatial position indications returned by OCR may differ from one mailpiece to another even when the mailpieces belong to the same run and are graphically uniform. However, as the OCR processing of the successive mailpieces belonging to the same run progresses, the zone defined by the unitary elements 7 tends statistically to stabilize, naturally provided that the information to be decoded by OCR remains in a stable position. In addition, if the position of this zone drifts while the mailpieces in the run are going past, the drift results in a shift in the zone defined by the unitary elements 7 in the matrix accumulator ACC1.

Figure 2B:
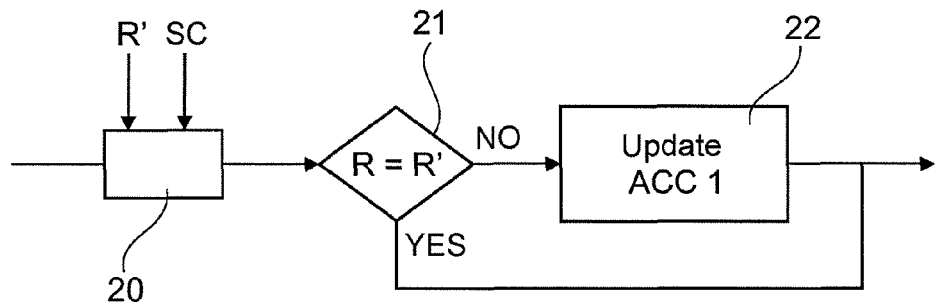
FIG. 2B shows the principle for consolidating the first type of accumulator.

The process of consolidating the matrix accumulator ACC1 is shown in more detail in FIG. 2B. At 20, spatial position indications SC are retrieved from the OCR with an address recognition result R. At 21, the result R is compared with the preceding result R' recorded in a memory. If the two results R and R' differ beyond a certain level of tolerance (the recipient addresses normally differ from one mailpiece to another), at 22 the pixels of interest 6K are identified on the basis of the indications SC, and the unitary elements 7 of the matrix accumulator ACC1 that coincide spatially with the pixels of interest are incremented by one unit. Updating or consolidation of the matrix accumulator ACC1 is then finished. If the two results R and R' are identical to within a certain level of tolerance (the results are constituted by the same sender address), the process does not perform the consolidation of the matrix accumulator ACC1.

FIG. 3 shows a second type of matrix accumulator designated by ACC2 next to a movement vector field map 9 (or an optical flow map). The matrix accumulator ACC2 is also in the form of a matrix in which the accumulation unitary elements are counters. The unitary elements of this matrix are superposed as they are in the matrix of the matrix accumulator ACC1 on the pixels of the images of the mailpieces of a run. The dark squares 10 designate unitary elements having extreme accumulation values. The unitary elements 10 substantially define a zone that corresponds to a recipient address block.

Calculating movement vector fields in images by using a method of locally graphically correlating blocks of image pixels is known per se. The vector fields are representative of the variations in an animated image in terms of shifts of image points. In the present invention, an optical flow technique is used on the basis of two images IA and IB of respective ones of two consecutive mailpieces of a run in order to detect relative shifts in image points of one image IA relative to the other image IB, occurring mainly in the recipient address block when the images are two uniform images of respective ones of two mailpieces that belong to the same run.

The local graphic correlation technique is known per se and consists substantially in the following steps. An image IA (not shown) is subdivided into a grid of small square blocks. For each block of pixels in the image IA, a search is made in a corresponding zone of an image IB (not shown) for a block of pixels that maximizes the local graphical correlation value for correlation between the two blocks of pixels. The calculation of the local correlation value is, for example, the product of two correlation coefficients (ratio between a covariance coefficient and a product of two standard deviations), one of which coefficients is obtained on the basis of the projection on the ordinates axis of the intensities of pixels of the block of the image IA and of the pixels of the block of the image IB, the other coefficient being obtained by projection on the abscissa axis of the intensities of pixels of the block of the image IA and of the pixels of the block of the image IB.

In FIG. 4A, reference 11 designates a block of pixels of the image IA, e.g. a block of 15×15 pixels in a digital image of a mailpiece. Reference 12 designates a zone (e.g. a block of 30×30 pixels) in another image IB of another mailpiece, in which image a local correlation with the block of pixels 11 is sought. In FIG. 4, reference 11' in the image IB designates the block of pixels as correlated graphically with the block of pixels 11. The spatial offset between the two blocks of pixels 11 and 11' in the respective images IA and IB as measured along the abscissa and the ordinate is representative of a local shift between the two images IA and IB. This spatial offset may be evaluated and represented in the form of a movement vector field that is represented symbolically in FIG. 4A by a directional vector 13.

Returning to FIG. 3, the movement vector field map 9 thus constitutes an optical flow map (or a movement vector field map) that indicates the variations in terms of relative movement of image points between two images that, in this example, are respectively of two consecutive mailpieces belonging to the same run. In this optical flow movement vector field map 9, various types of movement vector fields are shown, represented by various pixels 9A, 9B, and 9C of the movement vector field map 9.

The pixels 9A are representative of a local correlation of blocks of pixels without any local shift, indicating that the two images IA and IB are locally graphically superposed in locally identical manner.

The pixels 9B are representative of a local correlation of blocks of pixels in the presence of a local shift, indicating that the two images IA and IB are graphically superposed in locally identical manner, but with a relative offset. For these pixels 9B, and within the ambit of the invention, the local shift that is represented by a directional vector 13 may have as its origin an overall offset of the image IA relative to the image IB, e.g. due to instability in the conveying of the mailpieces. The local shift at the level of a pixel 9B may also have as its origin a localized difference in the graphics between two images IA and IB, e.g. due to the fact that the recipient addresses in the two uniform images IA and IB are different. In FIG. 3, it should be noted that not all of the directional vectors 13 of the pixels 9B have the same direction, which, in the example, means that the origin of the movement is not an overall offset of the image but rather a localized difference.

The pixels 9C are representative of an absence of local correlation of blocks of pixels that indicates that the two images IA and IB are not graphically superposed in locally identical manner.

The blank zones in the movement vector field map 9 correspond to image zones without any graphics and thus of no interest for forming the matrix accumulator ACC2. These blank zones are zones of the surfaces of the mailpieces of plain color that do not bear any information to be recognized by OCR.

In accordance with the invention, the matrix accumulator ACC2 is consolidated by incrementing the unitary accumulation elements such as 10 that coincide spatially with pixels of interest identified on the basis of the optical flow map 9 (i.e. in superposition as for the matrix accumulator ACC1). These pixels of interest represented by 9K in FIG. 3 are the pixels 9C of the optical flow map 9 that are representative of absence of local correlation, and the pixels 9B of the optical flow map 9 that are representative of a local correlation with a spatial shift but only the pixels 9B that do not result from an overall image shift as indicated above. By way of example, the pixels 9B that do not result from an overall image shift have adjacent pixels 9B but with vectors 13 that are directed differently.

FIG. 4B shows the principle of consolidation of the matrix accumulator ACC2. At 40, local graphical correlation processing (after a possible filtering step) is applied to each image IA of a current mailpiece belonging to a run and to the image IB of the mailpiece consecutively preceding the current mailpiece and belonging to the same run, as indicated above in order to form an optical flow map 9, and, at 41, on the basis of this optical flow map 9, pixels (or blocks of pixels) of interest 9K are identified. Then the matrix accumulator ACC2 is consolidated (updated) by incrementing by one unit the unitary elements of the matrix accumulator ACC2 that coincide with the pixels of interest. As the OCR processing progresses for the successive mailpieces belonging to the run, the consolidation of the matrix accumulator ACC2 tends also to show up a relatively stable zone of unitary elements 10, each of which has an extreme accumulation value.

Figure 5:
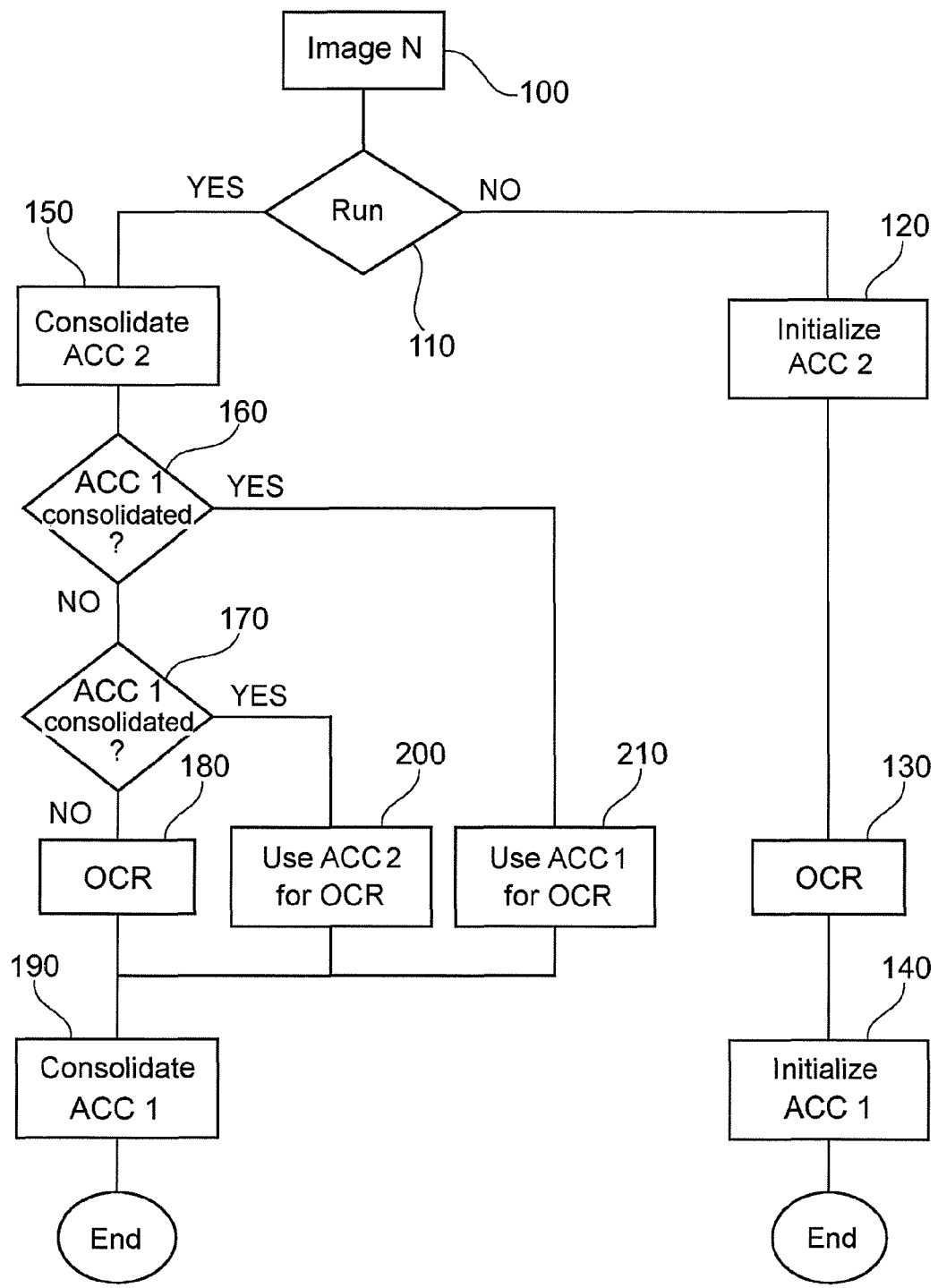
FIG. 5 is a flow chart showing an implementation of the processing method of the invention that uses the two types of accumulator for locating the recipient address blocks in images of mailpieces that belong to a run.

FIG. 5 is a flow chart schematically showing an example of the process of the invention for automatically locating the recipient address block.

In step 100, a digital image N of a current mailpiece A is delivered by the digital camera 3 to the data-processing and monitoring-and-control unit 4.

In step 110, in the data-processing and monitoring-and-control unit 4, and on the basis of the digital image N, it is decided by any suitable means whether or not the mailpiece belongs to a run listed in a dictionary stored in a memory by the unit 4.

At 120, it is assumed that the current mailpiece does not belong to a run listed in the dictionary. The processing continues by creating a new run recording in the dictionary of runs. This new recording contains the matrix accumulator ACC2 as initialized at zero (the accumulation values of all of the unitary elements are zero).

At 130, standard recognition processing is applied to the image N, i.e. processing without assistance for automatically locating the recipient address block.

At 140, the processing continues by creating the matrix accumulator ACC1 initialized at zero (the accumulation values of the unitary elements are zero) in the recording of the run created at 120. Then the process returns to the initial step 100.

At 150, it is assumed that the current mailpiece belongs to a run that has its characteristic data model recorded in the dictionary of runs. It is understood that this mailpiece is thus preceded by at least one other mailpiece belonging to the same run in the stream of mail A, the image N-1 of which other mailpiece has been stored in the memory by the data-processing and monitoring-and-control unit 4.

The processing starts by consolidating the matrix accumulator ACC2 on the basis of the optical flow map 9 computed with the current image N of the current mailpiece and with the image N-1 of the mailpiece preceding said current mailpiece.

As can be seen in FIG. 5, the matrix accumulator ACC2 is used firstly on the first mailpieces of the run, whereas the matrix accumulator ACC1 is used after a significant number of subsequent mailpieces belonging to the run have gone past. It can be considered that the significant number of mailpieces is a settable parameter of the process. It may, for example, be set at 3 mailpieces for the matrix accumulator ACC2, and at about ten mailpieces for the matrix accumulator ACC1.

If, at step 160, a sufficient number of mailpieces of the run have already been processed, so that the matrix accumulator ACC1 is sufficiently consolidated, the processing continues at step 210 by applying OCR processing using the image zone definition indicated in the matrix accumulator ACC1.

If, at step 160, the matrix accumulator ACC1 has not yet been sufficiently consolidated, the processing continues at step 170. If, at this step, a sufficient number of mailpieces of the run have already been processed, so that the matrix accumulator ACC1 is sufficiently consolidated, the process continues at step 200 by applying OCR processing using the image zone definition indicated in the matrix accumulator ACC2.

If, at step 170, the matrix accumulator ACC1 has not yet been sufficiently consolidated, the processing continues at step 180, by applying standard OCR processing, i.e. OCR processing without assistance from automatic location of the recipient address block using an accumulator of the invention.

Then the process continues at 190 by consolidating the matrix accumulator ACC1 on the basis of the spatial position indications derived from one of the OCR processing steps 180, 200, or 210.

Then the process returns to the initial step 100 for processing a new mailpiece.

The matrix accumulator ACC1 can thus be used to characterize an information block other than the recipient address block, such as the sender address block, insofar as the spatial position of said information block can also be derived from OCR processing. Two matrix accumulators of the ACC1 type can be used at the same time in order to improve management of error situations in which a sender address block is mistaken for a recipient address block.

With the method of the invention, the zone of interest of the image, in which zone the recipient address block is to be recognized by OCR, is defined dynamically, as the processing of the successive mailpieces in a run progresses, thereby contributing to obtaining improved robustness for the locating of said address block.

Figure 6:
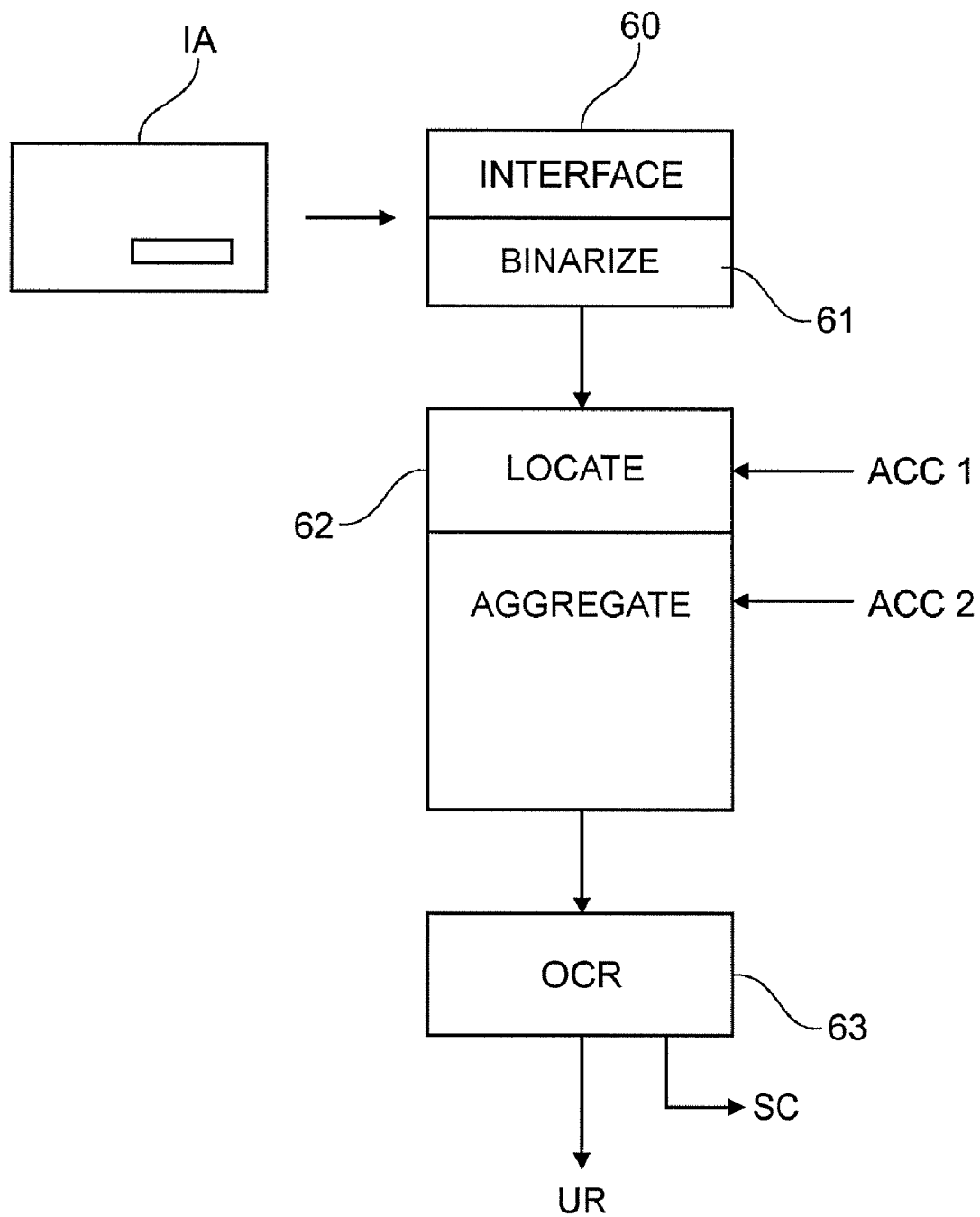
FIG. 6 is a block diagram showing an OCR address recognition process in schematic manner.

FIG. 6 is a block diagram showing OCR address recognition processing in highly schematic manner. This processing includes an inlet interface 60 that receives a grayscale digital image IA of a current mailpiece from the digital image acquisition system 3, and delivers it to a thresholding (binarization) module 61. The thresholding module 61 transforms the image IA into a binary image having pixels at "0" or at "1". The binary image is then delivered to an information location module 62. The information location module 62 scans all of the pixels of the binary image so as to detect the pixels at "1" and then so as to identify the components of connected pixels. On the basis of the identification of the connected components over all of the pixels in the binary image, the information location module 62 aggregates the connected components as is known per se in order to define information-bearing blocks of pixels. At the end of the processing in the information location module 62, the blocks of pixels can be identified on the basis of pre-recorded classification indications, as mentioned in the introduction, e.g. as corresponding to a recipient address block or to a sender address block, etc. The identified and sequenced blocks of pixels are then delivered to the OCR module 63 for OCR processing and for information decoding, which, for example, may be a postal address. In FIG. 6, reference UR designates an unambiguous decoding result returned by the OCR processing, and reference SC designates a spatial position indication returned by the OCR treatment.

FIG. 6 shows the two types of matrix accumulator ACC1 and ACC2 in relation to the location module 62. As indicated above, these two matrix accumulators ACC1 and ACC2 influence operation of the location module 62. The matrix accumulator ACC2 is used by the location module 62 more particularly for consolidating a matrix of scores produced by a training stage as is known per se. The image zone as defined in the matrix accumulator ACC2 generally does not have a clear-cut outline and thus cannot really serve as a frame for limiting an area. The matrix accumulator ACC1 is used by the location module 62 as an area-limiting frame and the connected components are then located only within the area-limiting frame, and not over the entire binary image.

What is claimed is:

1. A method of processing mail, in which method it is assumed that mailpieces belong to a succession of uniform mailpieces or "run", and, for each mailpiece in the run, OCR is performed on certain information to be recognized in a zone of interest of an image of said mailpiece, said zone of interest being associated in a memory with said run so as to force said OCR thereon, wherein the method comprises the steps of:
   a) initializing a matrix accumulator associated with said run of mailpieces and including unitary accumulation elements that correspond to the pixels of the image of a mailpiece of the run;
   b) on the basis of the image of the mailpiece, identifying pixels of interest that are representative of said zone of interest, and consolidating said matrix accumulator by incrementing the unitary accumulation elements of the matrix accumulator that coincide with said pixels of interest; and
   c) defining, in the OCR processing, said zone of interest of the image on the basis of the unitary accumulation elements of the consolidated matrix accumulator that present extreme accumulation values;
   and wherein, during the identification step, at least one of the following steps is performed:
   for consolidating said matrix accumulator, the OCR processing for a mailpiece of the run is used to derive an indication of the spatial position of a block of pixels in which the OCR processing has recognized said certain information unambiguously, the pixels of said block of pixels constituting pixels of interest; and
   for consolidating said matrix accumulator, deriving an optical flow map by construction and local graphical correlation of blocks of image pixels, said flow map being indicative of local graphical movements of pixels between two images of different mailpieces of the run, the image pixels corresponding to such graphical movements constituting pixels of interest, said optical flow map enabling the movements of said unitary accumulation elements to be tracked dynamically, and thus reinforcing the robustness of detection of said zone of interest.

2. A method according to claim 1, wherein the optical flow map is computed using a method of local graphical correlation between blocks of pixels of the two images of mailpieces of the run.

3. A method according to claim 1, wherein said certain information is recipient address information indicating the address of the recipient of the mailpiece.

4. A method according to claim 1, wherein said certain information is sender address information indicating the address of the sender of the mailpiece.

5. A method according to claim 1, wherein said certain information is franking information.

6. A method according to claim 1, wherein said certain information is a pictorial indication.

7. A method according to claim 3, wherein successive use is made of a first matrix accumulator of a first type as consolidated on the basis of indications derived from the OCR processing by incrementing the unitary accumulation elements of the matrix accumulator, and of a second matrix accumulator of a second type as consolidated on the basis of indications derived from optical flow maps by incrementing the unitary accumulation elements of the matrix accumulator.

8. A method according to claim 7, wherein the second matrix accumulator is used firstly for defining said zone of interest in the images of first mailpieces of the run, and then the first matrix accumulator is used for defining said zone of interest in the images of second mailpieces subsequent to the first mailpieces in the succession of mailpieces of the run.

9. A method according to claim 8, wherein said first accumulator is used as an area limiter for defining a zone of interest and the second accumulator is used to consolidate a matrix of scores produced by a training stage.

10. A machine for processing mail, in particular for sorting mail into sorting outlets of a sorting conveyor, said machine including an image acquisition system connected to a data-processing and monitoring-and-control unit, wherein said unit is arranged to implement the method of processing mail, in which method it is assumed that mailpieces belong to a succession of uniform mailpieces or "run", and, for each mailpiece in the run, OCR is performed on certain information to be recognized in a zone of interest of an image of said mailpiece, said zone of interest being associated in a memory with said run so as to force said OCR thereon, wherein the method comprises the steps of:
   a) initializing a matrix accumulator associated with said run of mailpieces and including unitary accumulation elements that correspond to the pixels of the image of a mailpiece of the run;
   b) on the basis of the image of the mailpiece, identifying pixels of interest that are representative of said zone of interest, and consolidating said matrix accumulator by incrementing the unitary accumulation elements of the matrix accumulator that coincide with said pixels of interest; and
   c) defining, in the OCR processing, said zone of interest of the image on the basis of the unitary accumulation elements of the consolidated matrix accumulator that present extreme accumulation values;
   and wherein, during the identification step, at least one of the following steps is performed:
   for consolidating said matrix accumulator, the OCR processing for a mailpiece of the run is used to derive an indication of the spatial position of a block of pixels in which the OCR processing has recognized said certain information unambiguously, the pixels of said block of pixels constituting pixels of interest; and for consolidating said matrix accumulator, deriving an optical flow map by construction and local graphical correlation of blocks of image pixels, said flow map being indicative of local graphical movements of pixels between two images of different mailpieces of the run, the image pixels corresponding to such graphical movements constituting pixels of interest, said optical flow map enabling the movements of said unitary accumulation elements to be tracked dynamically, and thus reinforcing the robustness of detection of said zone of interest.

* * * * *